United States Patent [19]

Stoneburner et al.

[11] 4,080,608

[45] Mar. 21, 1978

[54] FLUIDICS SYSTEM FOR A JET DROP PRINTER

[75] Inventors: Leonard G. Stoneburner, Fairborn; Ronald T. Wilson, Dayton, both of Ohio

[73] Assignee: The Mead Corporation, Dayton, Ohio

[21] Appl. No.: 704,573

[22] Filed: Jul. 12, 1976

[51] Int. Cl.[2] .......... G01D 15/18

[52] U.S. Cl. .......... 346/75; 346/140 R; 251/61.5

[58] Field of Search .......... 346/75, 140; 251/61.5, 251/61.4

[56] References Cited

U.S. PATENT DOCUMENTS

| | | | |
|---|---|---|---|
| 3,596,275 | 7/1971 | Sweet | 346/75 X |
| 3,689,025 | 9/1972 | Kiser | 251/61.4 X |
| 3,891,121 | 6/1975 | Stoneburner | 346/75 X |
| 3,971,039 | 7/1976 | Takano et al. | 346/75 |

*Primary Examiner*—Joseph W. Hartary
*Attorney, Agent, or Firm*—Biebel, French & Nauman

[57] ABSTRACT

A jet drop printing head comprises a transportable upper assembly and a lower assembly adapted for receiving the upper assembly in such a manner as to control the alignment between the two assemblies. The upper assembly, which is primarily a fluidics package, carries an orifice plate and fluidic elements for producing a jet-forming flow of printing liquid through a series of orifices in the orifice plate. There is also a fluidics system which minimizes accumulation of coagulated ink and includes a double diaphragm having a valving diaphragm which works against the raised lip of a conduit insert and a control diaphragm which works against a valve closing spring.

13 Claims, 40 Drawing Figures

FLUIDICS SYSTEM FOR A JET DROP PRINTER

BACKGROUND OF THE INVENTION

This invention relates to jet drop printing heads of the general type in Beam et al U.S. Pat. No. 3,586,907. Such printing heads comprise an orifice plate for forming a row of liquid jets and a charge ring plate provided with a series of charge rings for selective charging of drops formed by the jets. There are also fluidic elements for supplying printing liquid to the orifice plate, deflection electrode means for deflection of drops charged by the charge rings, and a catcher for catching drops which are so deflected. Non-deflected drops deposit upon a printing medium transported below the print head.

Jet drop print heads of the above described type are inherently capable of high speed, high resolution printing, but there are very exacting manufacturing tolerance requirements. Moreover use of the print head over a long period of time causes erosion of the orifice plate and deposition of contaminants in the fluidic system. Accordingly, it is necessary to disassemble the print head from time to time for refurbishing the fluidic elements and thereafter to reassemble the print head with the charge ring apertures in precise alignment with the jet forming orifices. In the past this has been a very tedious process and one which is difficult for unskilled or semi-skilled operating personnel in a normal operational environment.

The Beam et al print head has a further difficulty in that a plurality of such print heads must be assembled together to provide solid printng coverage. Such an assembly may be accomplished as shown in Cassill U.S. Pat. No. 3,580,515, but there is in any event some difficulty in achieving the necessary alignment accuracy between the different heads. The Beam et al print head was therefore improved by the invention of a new print head arrangement as taught by Mathis U.S. Pat. No. 3,701,998.

The Mathis patent shows a twin row print head capable of solid printing coverage without the cooperation of any other print head. Again there is provision for an orifice plate and a charge ring plate which is in alignment therewith. The Mathis device contemplates an extremely large number of very small diameter jets and at the time of its invention represented a new generation of jet drop print heads. The new level of resolution obtainable by the Mathis device created a requirement for even more accurate alignment between the orifice plate and the charge ring plate.

In order to facilitate assembly and disassembly of jet drop printing elements of the type shown in the Mathis patent there has been developed an improved mounting arrangement as shown in Brady et al U.S. Pat. No. 3,805,273. In this arrangement there is a segregation between the fluidic elements, which are incorporated into an upper assembly, and the electrical elements, which are incorporated into a lower assembly. With such an arrangement it is relatively easy to disassemble the print head for refurbishment of the fluidic package. However, reassembly is a somewhat tedious process because of the above mentioned requirement for precision alignment between the orifice plate, now part of the upper assembly and the charge ring plate, which is part of the lower assembly. Also, for improved operation in the field, it has become desirable to improve the catcher mounting arrangement and extend operating life of the fluidic package.

SUMMARY OF THE INVENTION

This invention provides an improved fluidics system for a jet drop printer including a housing, an orifice plate mounted on said housing and valves also mounted on said housing for supplying printing liquid and purge liquid to the orifice plate. Printing liquid and purge liquid both flow through the same valve enroute to the orifice plate, so that the valve can be cleansed by the purge liquid. A second valve provides printing liquid to the first valve, and there are bypass means for circulating printing liquid past the first valve and away from the housing. A third valve provides purge liquid to the first valve.

In preferred embodiment the invention provides a fourth valve for providing purge liquid to the third valve, all four valves being pneumatically operated diaphragm valves and filtering means being provided between the second and first valves and also between the fourth and third valves. The housing preferably is a clear plastic structure with a handle for ease of transporting the apparatus from a refurbishment center to a printing plant requiring a replacement.

The invention further provides an improved diaphragm type valve which is closed by urging a diaphragm against an upstanding lip of a conduit communicating therewith. Valve closing means, preferably a spring, force a control rod against the diaphragm to cause a valve closure action, and valve opening means, preferably a pneumatically operated second diaphragm are arranged for moving the control rod away from the first mentioned diaphragm.

It is therefore an object of this invention to provide an improved fluidics system for a jet drop printer.

Another object of this invention is to provide a fluidics package fo a jet drop printer that is easily transported, serviced and maintained.

A further object of the invention is to reduce collection of coagulated printing liquid deposits in an ink jet print head.

Still another object of the invention is to provide a valve which opens and closes without mechanical rubbing and which has improved shutoff characteritics.

Other and further objects of the invention will be apparent from the following description, the accompanying drawings and the appended claims.

DESCRIPTION OF THE PREFERRED EMBODIMENTS

Figure 1:
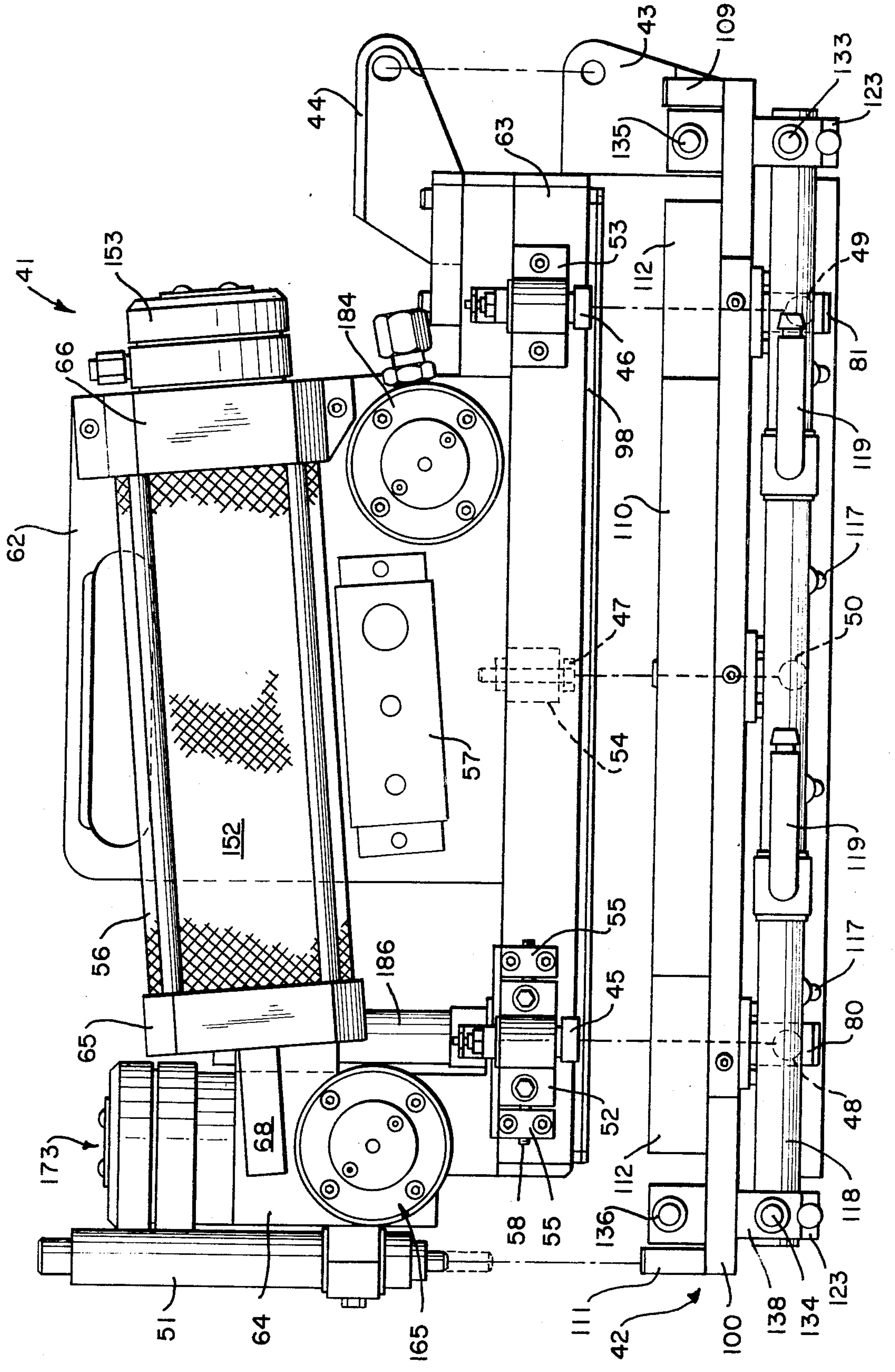
FIG. 1 is an assembly drawing showing an upper assembly, a lower assembly and the mating relationship therebetween.
Figure 29:
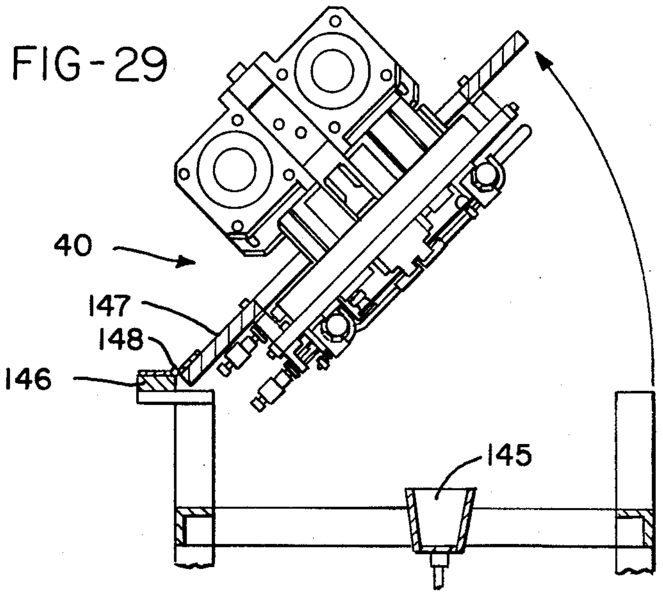
FIG. 29 illustrates mounting arrangements for a printing head at a printing station.

A print head 40 constructed in accordance with this invention may appear as illustrated generally in FIG. 29 and in more detail in FIG. 1. Head 40 comprises an upper assembly 41, which is primarily a fluidics package and a lower assembly 42, which contains the principal electrical components. Upper assembly 41, however, does include an electrically driven stimulator 186 and a driver 57 therefor. The stimulator causes drop generation as taught by U.S. Pat. No. 3,739,393, and may be constructed as taught by U.S. Pat. No. 3,701,476. It is fitted into an opening 183 of FIG. 2. Driver 57 is constructed for operation generally in accordance with the teachings of U.S. Pat. No. 3,868,698.

Figure 28:
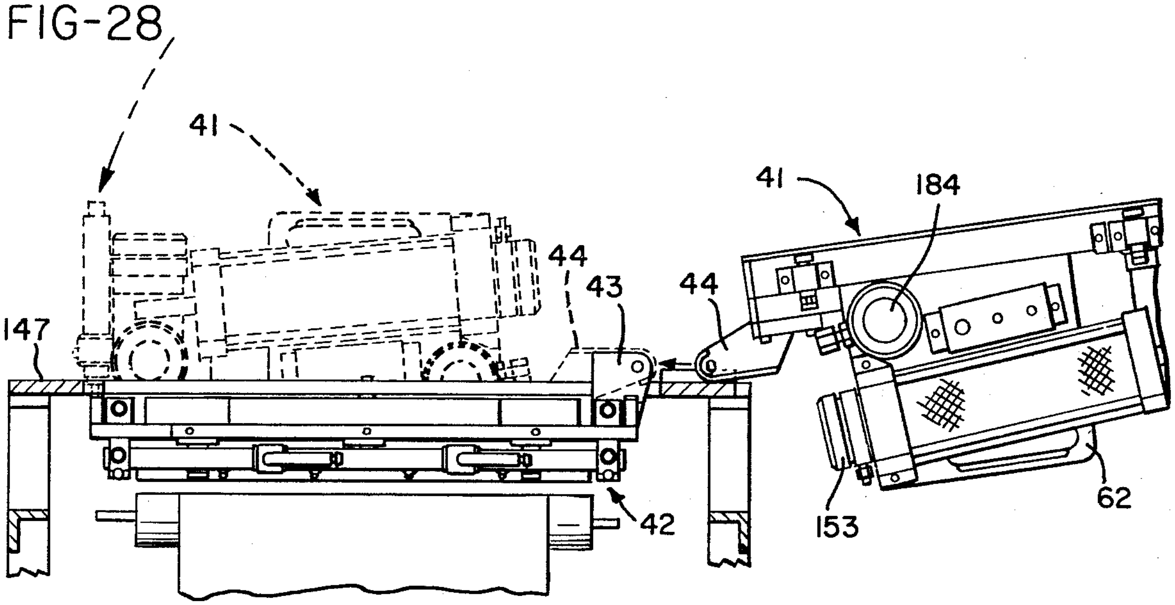
FIG. 28 illustrates the procedure for mounting an upper assembly into a lower assembly.

Upper assembly 41 includes a mounting fitting 44, and lower assembly 42 includes a clevis 43 for reception of mounting fitting 44. In operation upper assembly 41 is subject to deterioration and requires periodic refurbishment. Accordingly a replacement upper assembly 41 may be mated to an old lower assembly 42 as illustrated generally in FIG. 28. An impact absorber 51 absorbs the shock of the final step in the mating procedure. Upper assembly 41 is configured for ready carrying in a suitable carrying case (not illustrated), whereby transportation from a refurbishing center to an on-site printing press is easily effected. In operation lower assembly 42 is supported at a printing station by a table top 147 (FIG. 29).

The interface between upper assembly 41 and lower assembly 42 is defined by three precision steel balls 48 through 50 and three rests 45 through 47. These three rests respectively have conically shaped, vee-shaped, and flat feet as hereinafter described in detail.

Figure 19:
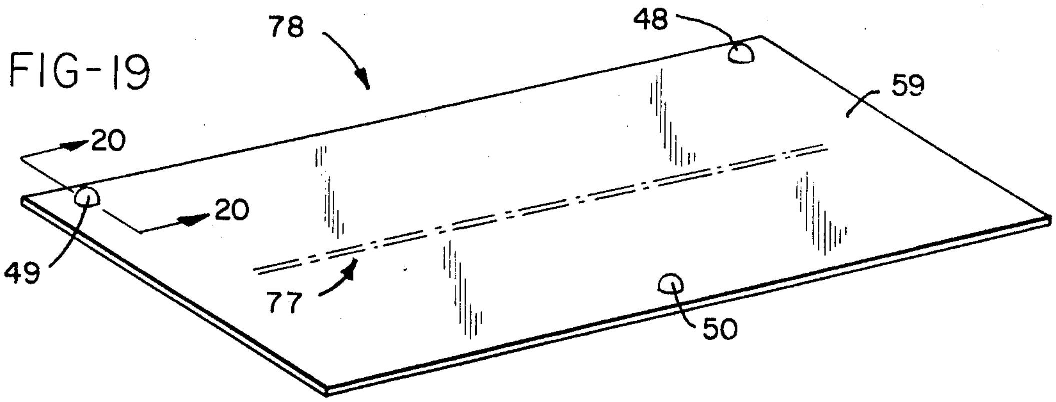
FIG. 19 is a pictorial illustration of a charge plate assembly.

Rest 45 is carried by a moveable mounting block 52, which is attached to a pair of adjustment blocks 55 by a threaded member 58. Rests 46 and 47 are carried respectively by mounting blocks 53 and 54. Balls 48 through 50 are carried by charge ring plate 59 as illustrated in FIG. 19.

The above described ball and rest arrangement provides an extremely accurate, easily mated, three-point interface between upper assembly 41 and lower assembly 42. The alignment procedure, which is further described below, is similar in many respects to the procedure for alignment of a mirror mounted by kinematic mounting in an interferometer. As a result the orifices in an orifice plate 60 (see FIG. 12) may be brought into precise registration with the charge rings in charge ring plate 59. Charge ring plate 59 is manufactured to extremely exacting tolerances, so that once an upper assembly 41 has been aligned to any charge ring plate 59, it may be quickly fitted to a lower assembly 42 carrying any other charge ring plate. Having achieved the required alignment, drop generation, charging and catching may be carried out as generally taught in U.S. Pat. Nos. 3,701,998 and 3,739,393.

Figures 2, 3, 4:
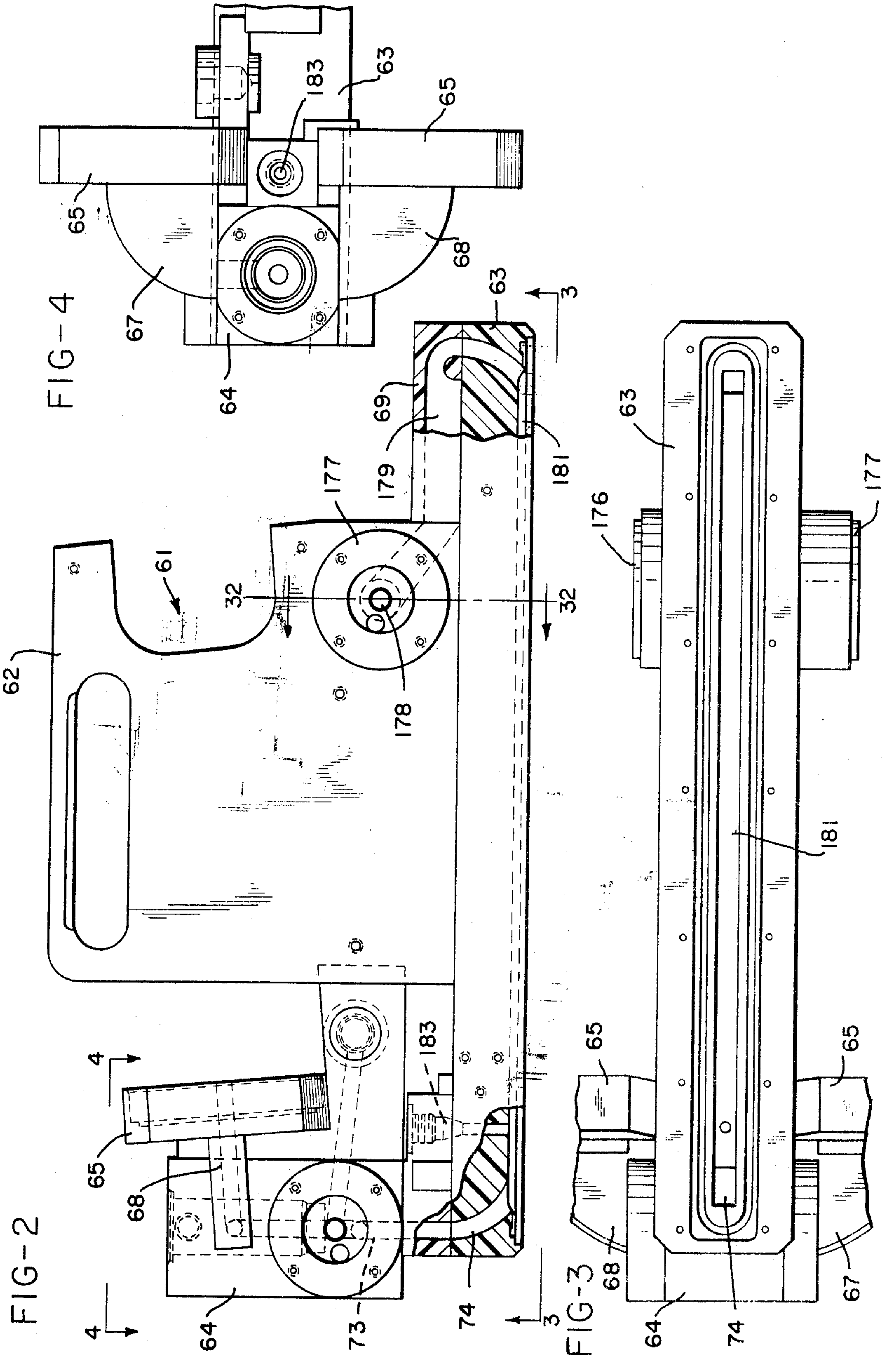
FIG. 2 is a side elevation view of a housing for a fluidics package.
FIG. 3 is a view taken along lines 3—3 of FIG. 2.
FIG. 4 is a view taken along lines 4—4 of FIG. 2.
Figure 6:
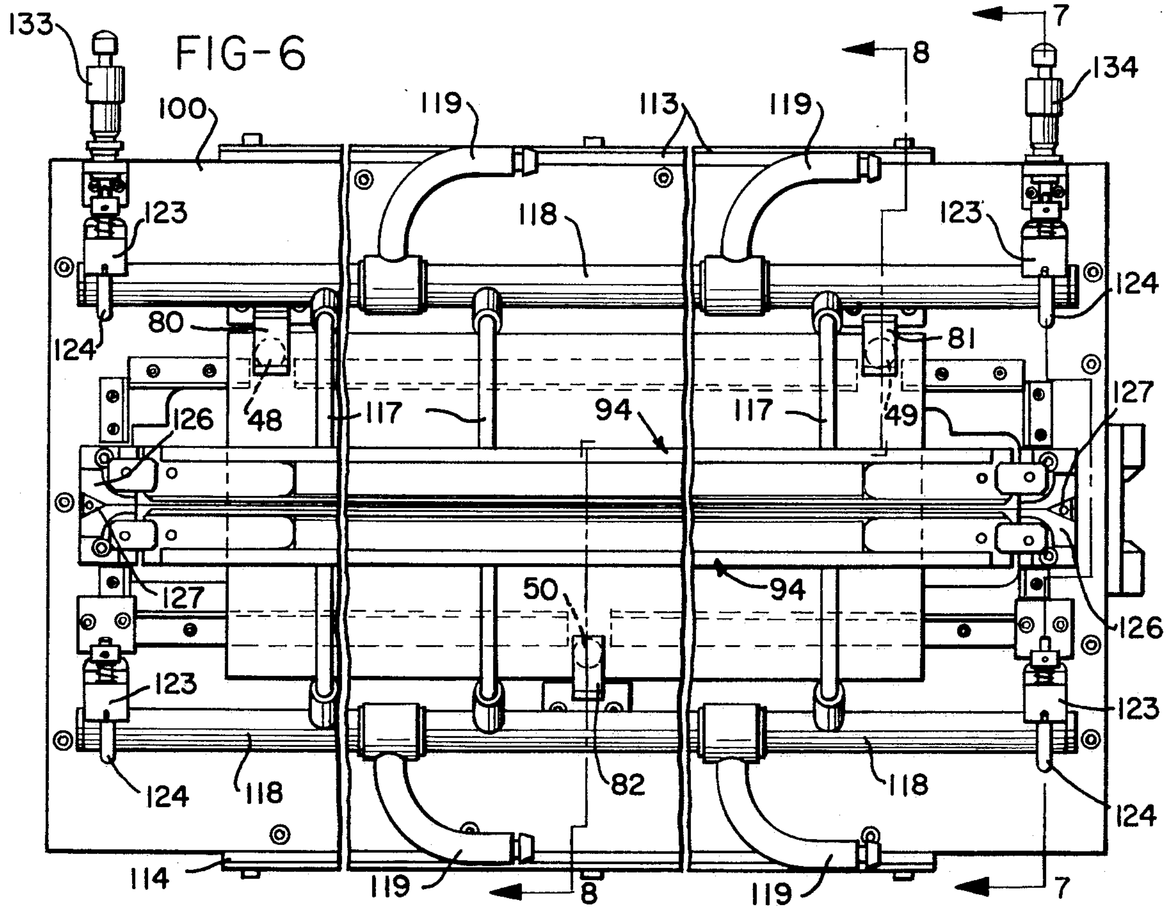
FIG. 6 is a bottom plan view of a lower assembly.
Figures 7, 8:
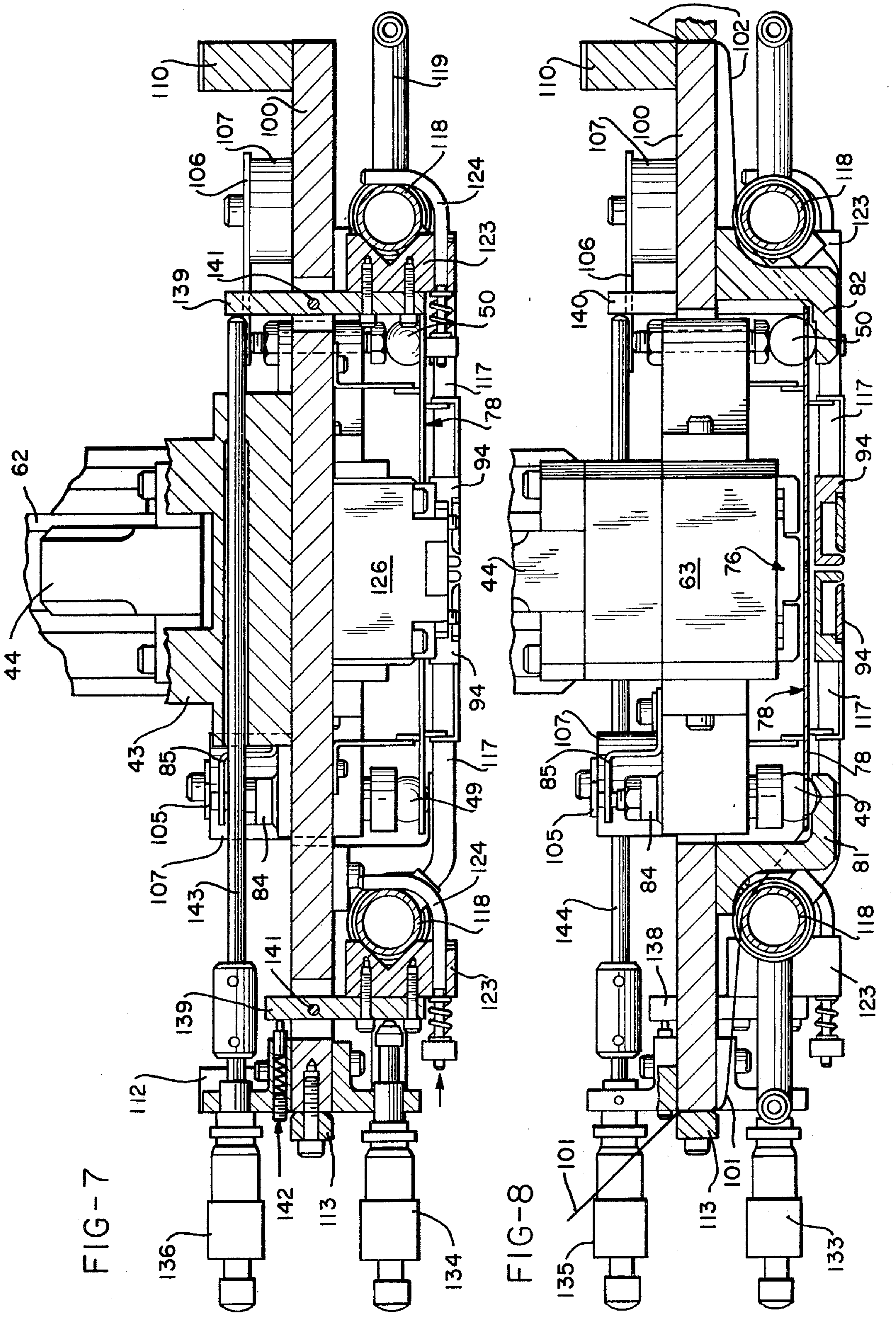
FIG. 7 is a view taken along lines 7—7 of FIG. 6.
FIG. 8 is a view taken along lines 8—8 of FIG. 6.
Figure 12:
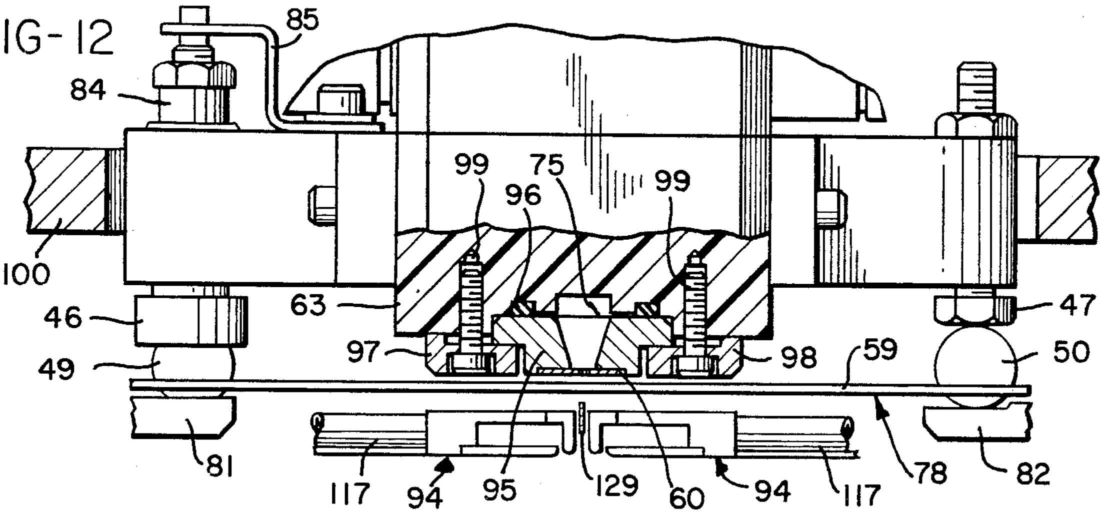
FIG. 12 is a partially cut away end view of a jet drop print head with an orifice plate assembly mounted in the operating position.
Figure 13:
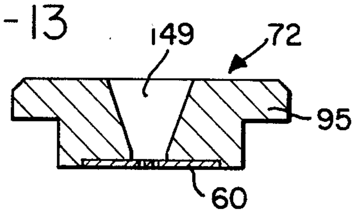
FIG. 13 is a cross-sectional view of an orifice plate assembly.

The principal structural element of upper assembly 41 is a plastic housing 61 as illustrated in FIGS. 2 through 4. An orifice plate assembly 72 (FIG. 13) is attached to housing 61 as shown in FIG. 12. Bottom assembly 42 is shown somewhat in more detail in FIG. 5, and further details of the overall combined head assembly are shown in FIGS. 6 through 8.

Referring now to FIG. 2, it will be seen that housing 61 comprises a handle portion 62, a manifold portion 63, a liquid inlet block 64, and an air return block 69. Housing 61 is conveniently fabricated from clear acrylic plastic, the various elements thereof being separately fabricated and cemented together to create an unitary structure. The passageways as illustrated are conveniently fashioned by a lost wax casting process.

The clear acrylic plastic construction material has been found to be relatively inert in the presence of water base printing inks, and the inherent transparency enables ready location of blocked internal passages. Furthermore, the plastic material is a natural acoustic damper. Thus, the housing will not interfere with stimulation of the jets by vibrating at harmonics of the stimulation frequency.

Cemented to housing 61 as intetral parts thereof are a pair of filter lower supports 65 and two rib members 67 and 68. Rib member 67 is provided with an ink supply passage 70 (see FIG. 30), and rib member 68 is provided with a purge fluid supply passage 71. Passages 70 and 71 are internally connected via a passage 73 to a liquid outlet passage 74 and an elongated cavity 181. Cavity 181 cooperates with another cavity 149 in an orifice plate holder 95 (FIG. 13) to define a reservoir for printing ink being pumped through orifice 76 in orifices plate 60.

In order to reduce turbulence in flush fluid or ink being supplied to orifice plate 60, liquid outlet passage 74 may have a square crossection. Still further turbulence reduction may be achieved by fitting an inlet plate of appropriate configuration between housing 61 and orifice plate assembly 72. This inlet plate may be configured as taught by Houser U.S. Pat. No. 3,645,448 or alternatively may be a screen-type device with a relatively large mesh.

Figure 14:
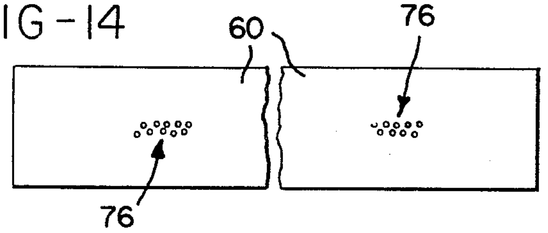
FIG. 14 is a plan view of an orifice plate.
Figure 15:
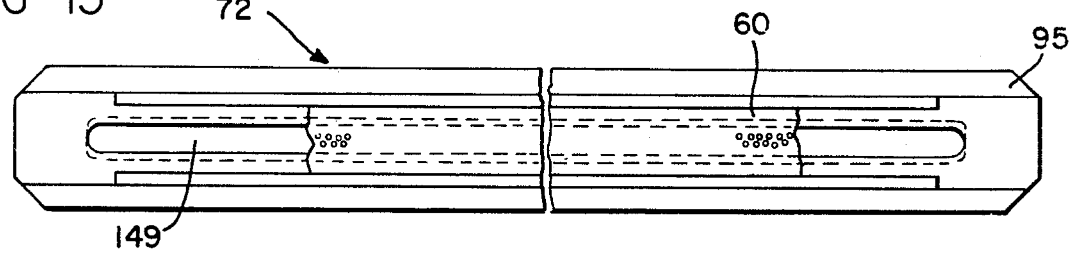
FIG. 15 is a bottom plan view of an orifie plate assembly.

For the embodiment of the invention herein described there is an inlet plate 75 of the screen type, located as indicated in FIG. 12. The screen may be a sheet of 0.25 mm stainless steel with 0.3 mm openings spaced 0.5 mm apart. Jet forming orifices 76 in orifice plate 60 are somewhat smaller than the screen mesh openings, being about 0.0457 mm in diameter and arranged in two rows as illustrated in FIG. 14 at a center-to-center of spacing of 0.423 mm. The distance between the two rows may be on the order of about 0.148 cm. A total of 1,281 orifices 76 may be arranged as described to provide an active printing area 27.072 cm wide.

Figure 21:
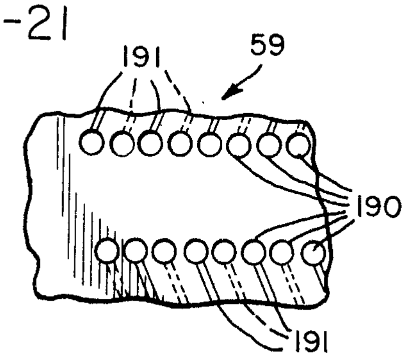
FIG. 21 is a fragmentary view of an arrangement of charge rings in a charge plate.

It will be appreciated that orifice plate 60 must be manufactured to extreme accuracy and aligned with very exacting precision to charge plate 59. As taught by Mathis U.S. Pat. No. 3,701,998 and Beam et al U.S. Pat. No. 3,586,907, charge plate 59 (FIGS. 19 and 21) is provided with a series of apertures 190 which are coated with conductive lining and connected to a series of printed circuit leads 191. For ease of manufacturing, printed circuit leads 191 may be alternately plated on opposite sides of charge ring plate 59. Prnted circuit leads 191 are connected electrically to cables 101 and 102 of FIG. 8. Cables 101 and 102 carry charge control signals, so that apertures 190 may function as jet charge control electrodes.

Each one of apertures 190 corresponds to one of orifices 76 and must be accurately aligned therewith for satisfactory normal operation. At the same time it is necessary to disassemble print head 40 periodically for refurbishment of the fluidic components including orifice plate 60. Ready assembly and diassembly for such purposes is provided by segregating the fluidic components from the electrical components as above described. Segregation of this type is not broadly new, as such a feature is incorporated in the prior art head of Brady et al U.S. Pat. No. 3,805,273. Prior to this invention, however, the alignment procedure associated with reassembly has been quite tedious and has required the skills of specially trained personnel.

It has now been found that field assembly may be accomplished quickly and easily by providing a charge plate assembly 78, an illustrated in FIG. 19, and assembling it within lower assembly 42 as hereinafter described. When thusly assembled charge plate assembly 78 is a geometrical reference structure capable of ready mating with any upper assembly 41 which has been prealigned with another such charge plate assembly 78.

Figure 20:
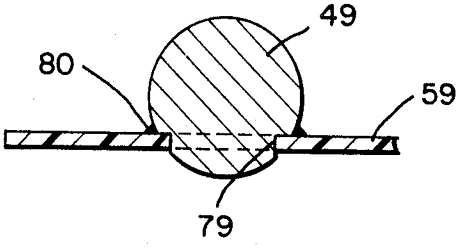
FIG. 20 is a sectional view taken along lines 20—20 of FIG. 19.

Charge plate assembly 78 comprises charge plate 59 and the three above mentioned precision machined balls 48 through 50. As illustrated in FIG. 20, charge plate 59 may have three ball seats 79 for reception of the balls 48 through 50. Each of the balls may have a surface ridge machined thereon for seating within its seat 79, and the ball may be bonded in place as at 80. Ball seats 79 and charge ring apertures 190 must be fashioned in charge plate 59 with equal accuracy, and either a machining or photofabrication technique may be used. Charge plate 59 may be made from a ceramic, plastic or other insulative material. Alternatively, it may be made of conductive material with an insulative coating to isolate the charge rings from one another.

Figure 23:
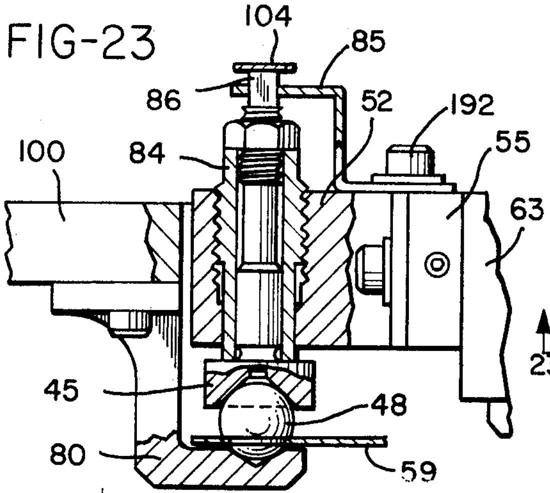
FIG. 23 is a view taken along lines 23—23 of FIG. 22.

As stated previously, balls 48 through 50 mate with three rests 45 through 47. Details of the mating relationship are shown in FIG. 23 wherein the cone-shaped foot of rest 45 is in engagement with ball 48. Ball 48 rests on a bracket 80, which is part of lower assembly 42. Balls 49 and 50 likewise rest on brackets 81 and 82, all three of said brackets being illustrated in FIG. 6. Bracket 80 has a cone-shaped seat 83 to match the foot of rest 45, and bracket 81 similarly has a vee-shaped seat (not illustrated). The upper surface of bracket 82 is flat.

As shown in FIG. 23, rest 45 is carried by a threaded insert 84, which is threaded into mounting block 52. Rests 46 and 47 are carried by similar inserts, so as to provide means for adjusting the vertical dimensional relationship between upper assembly 41 and lower assembly 42, it being understood that rest 45, insert 84, and block 52 are all part of upper assembly 41.

Figure 22:
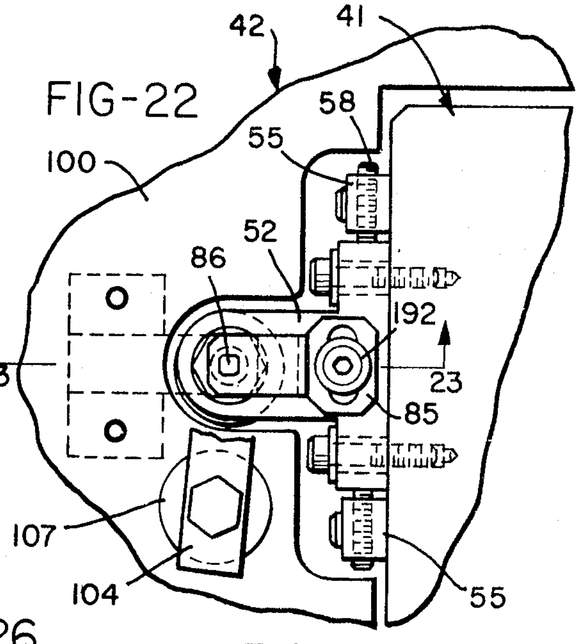
FIG. 22 is an illustration of an adjustable mounting for a rest.

Orifice plate 60 is carried by upper assembly 41 in fixed relation to the support structure for mounting blocks 52 through 54. Therefore, a rough, horizontally lengthwise, adjustment of orifice plate 60 relative to charge a charge plate or other reference fixtures may be accomplished by axial advancement of threaded member 58 (see FIG. 22). For fine adjustment of the relative horizontal positioning between the orifice plate and a charge plate there is provided an adjustment arm 85 for rest 45 and a similar adjustment arm (not included) for rest 46. For engagement with these adjustment arms, rests 45 and 46 have rectangular upper ends 86 and 87 as shown in FIGS. 24 and 25, respectively.

Figure 24:
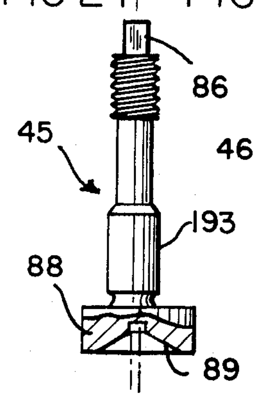
FIG. 24 is a view of a rest having a foot with a conical recess.
Figure 25:
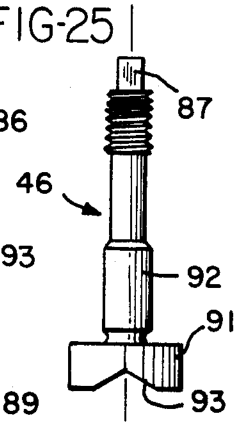
FIG. 25 is a view of a rest having a foot with a vee-shaped recess.
Figure 27:
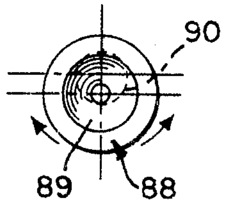
FIG. 27 is a bottom view of the rest of FIG. 24.

Referring now to FIG. 24, it will be seen that the conical recess 89 in foot 88 of rest 45 is positioned off center from the axis of shank 193. This means the center of conical recess 89 traces out a circular path as shown by the dotted circle 90 in FIG. 27 when shank 193 of rest 45 is rotated. Thus, it is possible to provide horizontal adjustment in two directions by loosening nut 192 of FIG. 23 and arcuately moving adjustment arm 85. The manufacturing and assembly tolerances of head 40 are such that the small amount of adjustment so provided is all that is ever required.

Figure 26:
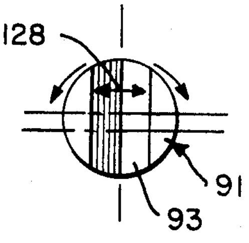
FIG. 26 is a bottom view of the rest of FIG. 25.

Having adjusted rest 45 as above described, it is necessary to make a similar adjustment to rest 46. Thus, the foot 91 of rest 46 engages its ball 49 at a point off center from shank 92. Since rest 46 is provided with a vee-type recess 93 in foot 91, rotation of rectangular upper portion 87 by an associated adjustment arm produces one dimensional movement of upper assembly 41 relative to a ball in mating engagement with recess 93. This relative motion is indicated by the double arrow of FIG. 26.

There are a number of techniques which may be employed for iteratively adjusting the two rests 45 and 46 to produce exact horizontal alignment between orifice plate 60 and a reference structure corresponding to charge plate 59. Such alignment may be carried out with the aid of suitable optical instruments and is customarily done by specially trained personnel at a refurbishing center, where new or refurbished upper assemblies 41 are being prepared for use with lower assemblies 42 already in the field.

Once the alignment has been completed, as above described, upper assembly 41 may be transported to a printing plant where there may be a lower assembly 42 requiring service. At the plant the old upper assembly may be removed and the new, prealigned upper assembly rapidly inserted into place. No further alignment should be required.

The fnal spatial relationship between orifice plate 60 and charge ring plate 59 is illustrated in FIG. 12. As shown therein, a pair of catchers 94 are mounted below charge ring plate 59 with a deflection ribbon 129 therebetween. Orifice plate 60 is soldered or otherwise bonded to an orifice plate holder 95, and orifice plate holder 95 is clamped against housing 61 by clamp members 97 and 98. A set of screws 99 (two of which are illustrated) maintain clamp members 97 and 98 in place. The screen 75 reduces ink turbulence, as above discussed, and an O ring 96 provides a seal between orifice plate holder 95 and housing 61.

Figure 5:
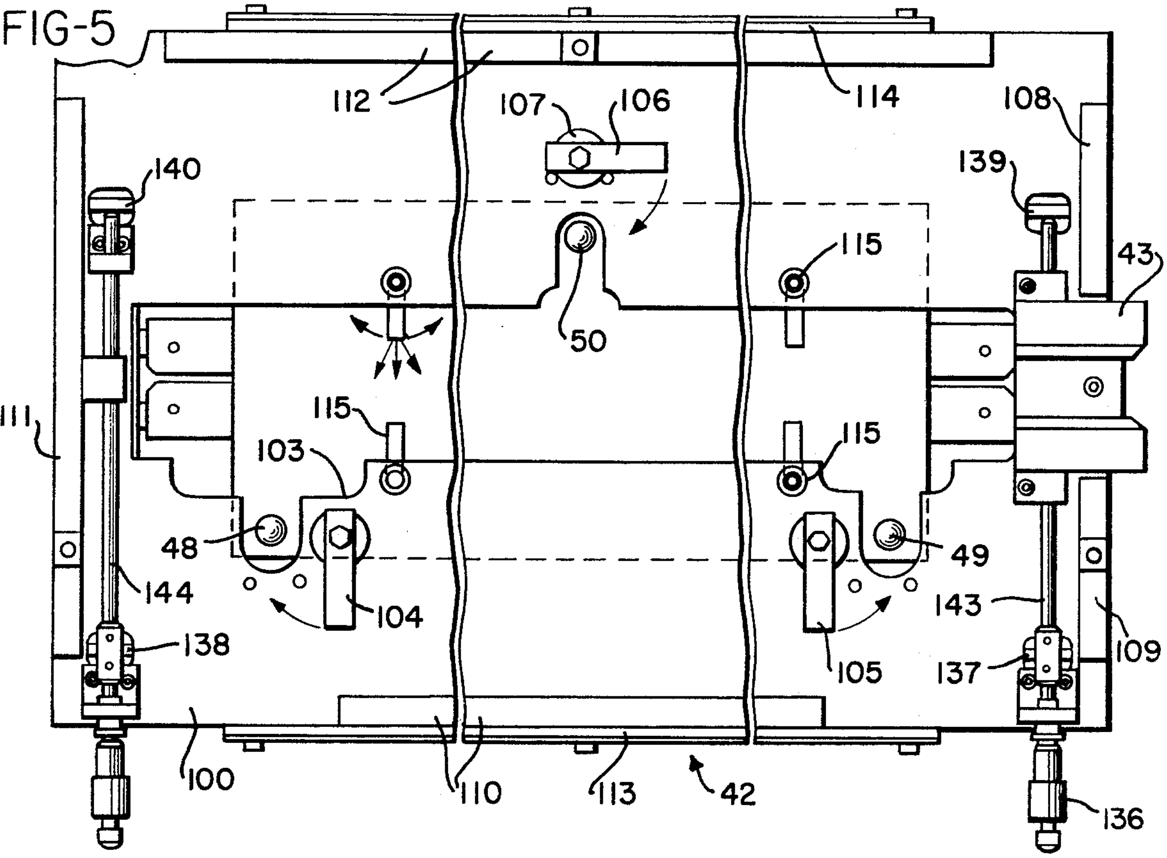
FIG. 5 is a top plan view of a lower assembly.

The princpal structural member of lower assembly 42 is a support plate 100, which has an enlarged opening 103 as best seen in FIG. 5. Upper assembly 40 fits downwardly through opening 103 and is locked in place by three retainers 104 through 106. Retainers 104 through 106 are mounted on seats 107 for engaging the upper surfaces of rests 45 through 47.

For added structural support there are five stiffening members 108 through 112, which are attached to support plate 100. Also attached to support plate 100 are two clamping members 113 and 114, which clamp electrical cables 101 and 102, respectively. This prevents structural damage to charge ring plate 59.

A further feature of lower assembly 42 provides a flow of cleaning and jet stablilizing air between orifice plate 60 and charge plate 59. For this purpose the lower assembly has a series of air supply tubes such as tube 115 of FIG. 11. Clean air, which is supplied by these tubes, flows into the space between orifice plate 60 and charge plate 59, and thence out of the space by flowing downwardly through charge rings 77. The space between charge plate 59 and orifice plate 60 is enclosed by a set of air skirts such as skirt 116.

Figure 10:
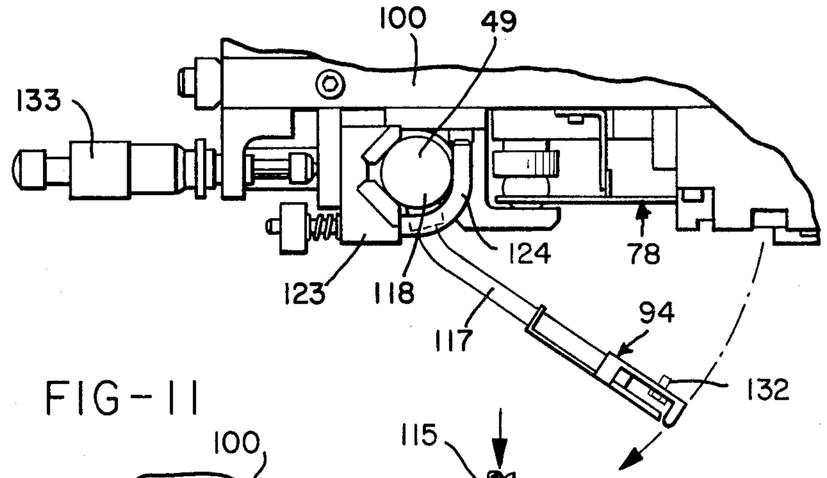
FIG. 10 is a fragmentary view illustrating downward swinging of a catcher.

Referring again to FIG. 12 it will be seen that catchers 94 are mounted in a position which obscures the lower surface of charge plate 59. During operation of the printer it sometimes becomes desirable to inspect the charge plate, and for this purpose catchers 94 can be swung downwardly as illustrated in FIG. 10. The mounting for the catchers enables such downward swinging while yet providing a capability for accurate adjustment of the operating positions of both catchers. The catcher assemblies, as illustrated in detail in FIGS. 33 through 37, each comprise a catcher 94 connected by four evacuation tubes 117 to a vacuum manifold 118. Vacuum manifold 118 is connected by two rotatable joints 120 to a pair of vacuum lines 119. Each joint 120 is sealed by seals 121, and in the operating position each vacuum line 119 communicates with its vacuum manifold 118 by an opening 122 in the wall of the manifold.

Figure 11:
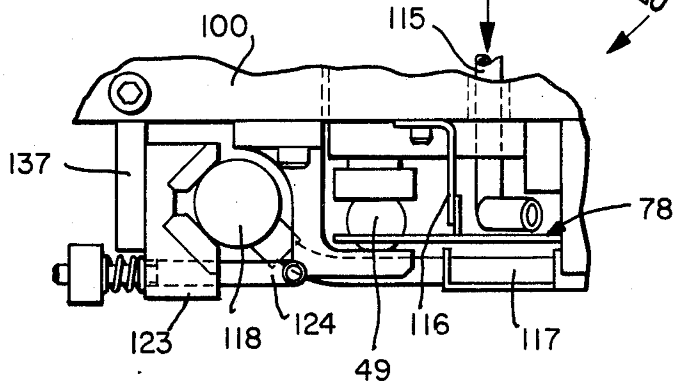
FIG. 11 is a fragmentary view illustrating means for providing air flow between an orifice plate and a charge plate.
Figure 17:
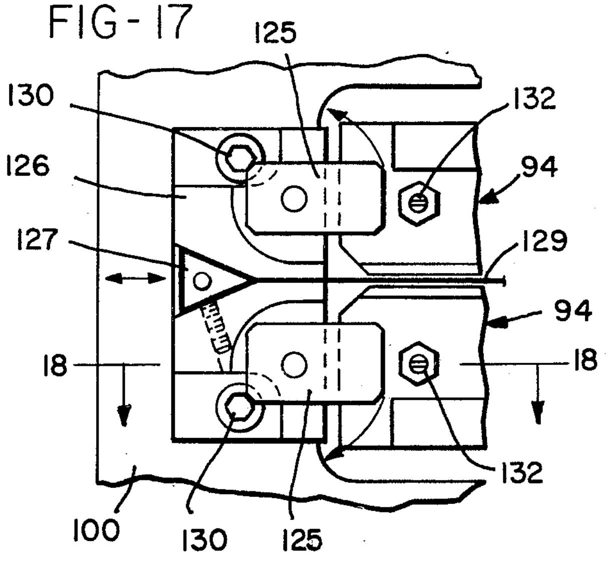
FIG. 17 is a bottom plan view showing support apparatus for a deflection ribbon.

The vacuum manifolds 118 are supported against vee blocks 123 by spring members 124, which may be rotated to the position shown in FIG. 11 to facilitate disassembly. When catchers 94 are in operating position they are supported at each end by a shoe 125 (see FIG. 17). Shoes 125 are mounted on end blocks 126 positioned at both ends of the catchers. Deflection ribbon 129 is stretched under tension between end blocks 126. For this purpose there are a pair of triangular tension blocks

127 about which deflection ribbon 129 is wrapped and which fit into botches in end blocks 126. The positions of end blocks 126 may be adjusted lengthwise of deflection ribbon 129 to control the tension thereon.

Figure 16:
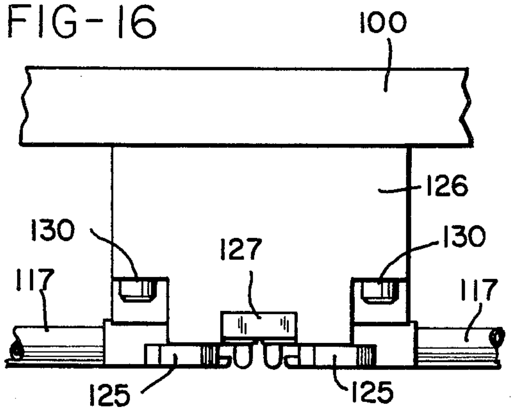
FIG. 16 is an end elevation view illustrating the positioning of a catcher support shoe.
Figure 18:
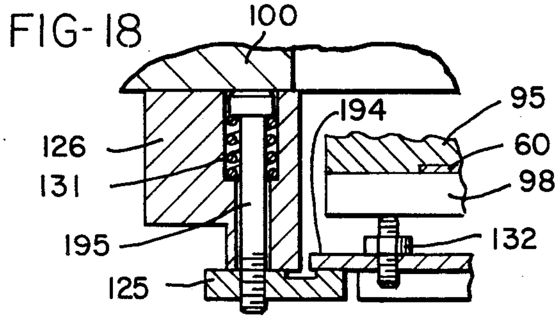
FIG. 18 is a view taken along lines 18—18 of FIG. 17.

The supporting relationship of shows 125 to catchers 94 is shown in detail in FIG. 18. Shoes 125 are secured to end blocks 126 by bolts 130 and springs 195. Shoes 126 are therefore movably supported and reach outwardly to engage catchers 94 under overhanging ledges 194. The vertical spacing of catchers 94 relative to orifice plate 60 is adjusted bg spacing devices 132 mounted on the upper surfaces of catchers 94. FIG. 16 illustrates the arrangement as viewed from the end of the printing head.

Horizontally inward and outwardly movement of catchers 94 relative to deflection ribbon 129 is controlled by micrometer-type adjustment knobs 133 through 136. Catchers 94 are mounted at above described against the blocks 123, an blocks 123 are supported by support brackets 137 through 140 as best illustrated in FIGS. 7 and 8. Support brackets 137 through 140 are pivogtaly mounted as at 141 and are urged against bis members 142 by shaft members positioned in response to manual adjustment of knobs 133 through 136.

Knob 136 controls the movement of a shaft 143, which reaches across the print head for positioning of bracket 139. Similarly, knob 135 positions a shaft 144 against bracket 140. Knobs 133 and 134 do not reach across the print head, but rather work directly against brackets 138 and 139 respectively. Thus, knobs 133 through 136 are all in the same side of the print head for convenient operator control.

Since knobs 133 through 136 are micrometer-type devices, catchers 94 may be positioned along their entire length in precise relationship with deflection ribbon 129. This adjustment is easily accomplished with the print web transport mechanism retracted and replaced by a drip pan such as drip pan 145 of FIG. 29. Print head 40, which is mounted in a table top 147 of a table 146 is positioned over drip pan 145, and all jets are switched into the print mode (all drops in all jets being unchanged). This directs all jets into the drip pan. Both of catchers 94 are then advanced inwardly toward deflection ribbon 129 until the catching faces thereof just barely touch the jets of ink. Knobs 33 through 136 are thereafter adjusted to back the catchers away from this positon by a predetermined distance. This should produce satisfactory catching, which can be checked by switching all jets into the catch mode. Table top 147 is connected to table 146 along a hinge line 148, so that point head 40 may be raised for servicing or inspection.

Startup and shutdown of the ink system is carried put generally in accordance with the teachings of Stoneburner U.S. Pat. No. 3,891,121. Accordingly, the ink supply cavity 149 of orifice plate holder 95 is maintained in a clean dry condition when the print head is not in use. Startup commences by pumping pressurized air into cavity 149, and following this with a purge fluid. After the purge fluid has formed free-standing, well stimulated jets, the flow of purge fluid is terminated, and ink is pumped into cavity 149. When printing is completed, fresh purge fluid is pumped into cavity 149 to replace the ink and clean out the system. After a short period of time the flow of purge fluid is terminated, and cavity 149 is dryed by application of a vacuum thereto.

Figure 30:
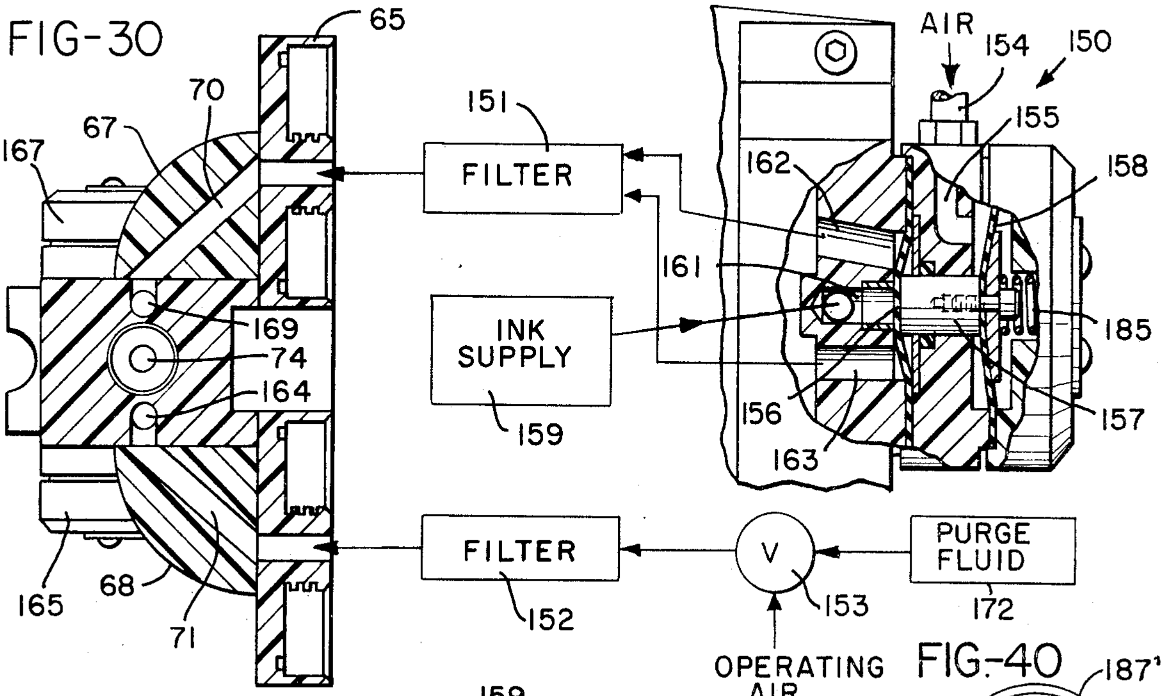
FIG. 30 is an illustration of a portion of an ink supply system for a jet drop printer.

In order to provide effective automatic control of the startup and shutdown sequences there has been provided a double diaphragm valve 150 as illustrated in FIG. 30. Valve 150 receives pressurized ink via conduit 161 from an ink supply 159 and operates under the control of pressurized air at inlet 154 to deliver the ink to conduits 162 and 163. Conduits 162 and 163 are connected to cannister type filter 151, which in turn provides filtered ink to passage 70 in rib member 67. A similar valve 153 supplies purge fluid from a pressurized supply tank 172 to passage 71 in rib member 67 via another cannister filter 152. Only valve 150 will be described in detail, it being understood that the description is applicable to valve 153.

Figure 39:
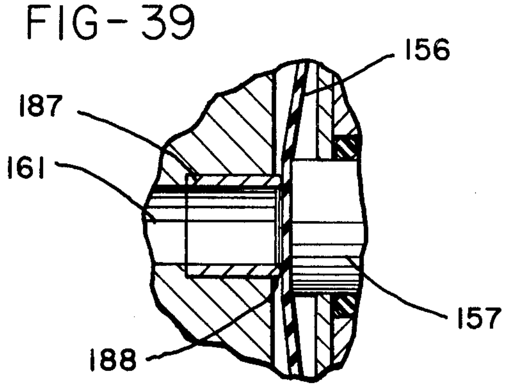
FIG. 39 is an enlarged view of a portion of FIG. 30 showing a vale seat.
Figure 37:
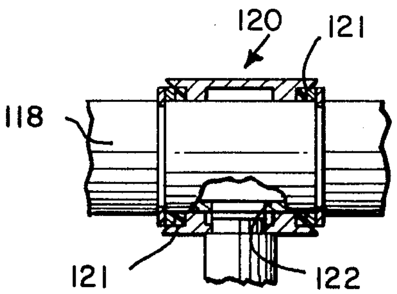
FIG. 37 is a view taken along lines 37—37 of FIG. 33.

Referring now to the enlarged view of FIG. 39 it will be seen that valve 150 has an insert 187 seated in conduit 161 with an upstanding lip 188. A first diaphragm 156 may be seated tightly against the lip 188 by a control rod 157, thereby shutting off the flow of ink through the valve. Insert 187 preferably is made of stainless steel and provides a tight line seal with only relatively modest force against control rod 157.

Control rod 157 is urged into the valve closing position of FIGS. 30 and 39 by a spring 185. Valve 150 is therefore normally closed and is opened when the fluidics control system (not illustrated) delivers pressurized air to inlet 154. The air flows from inlet 154 through passage 155 to bear against a second diaphragm 158. Diaphragm 158 works against spring 185, so that when the pressurized air (typically at a pressure of about 3.5 Kg per sq. cm) bears against the diaphragm, spring 185 is compressed to withdraw rod 157 to a valve opening position.

As shown in FIG. 30 conduits 162 and 163 are connected to filter 151 near the center thereof, and are angled so as to cause an outwardly directed flow of ink as it enters the filter. Thereafter the ink flows inwardly toward the axis of filter 151 for exit to passage 70.

Figure 31:
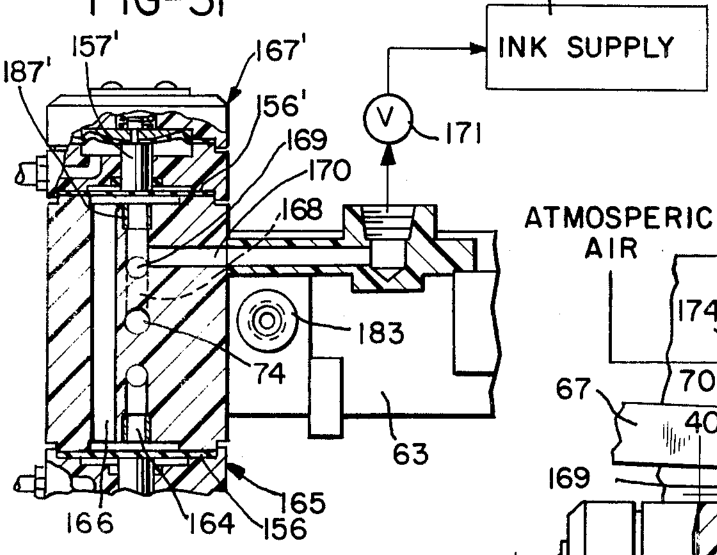
FIG. 31 illustrates a cross section between a purge liquid supply valve and an ink supply valve.
Figure 40:
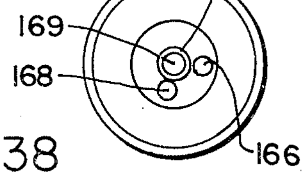
FIG. 40 is a view taken along lines 40—40 of FIG. 38.
Figure 38:
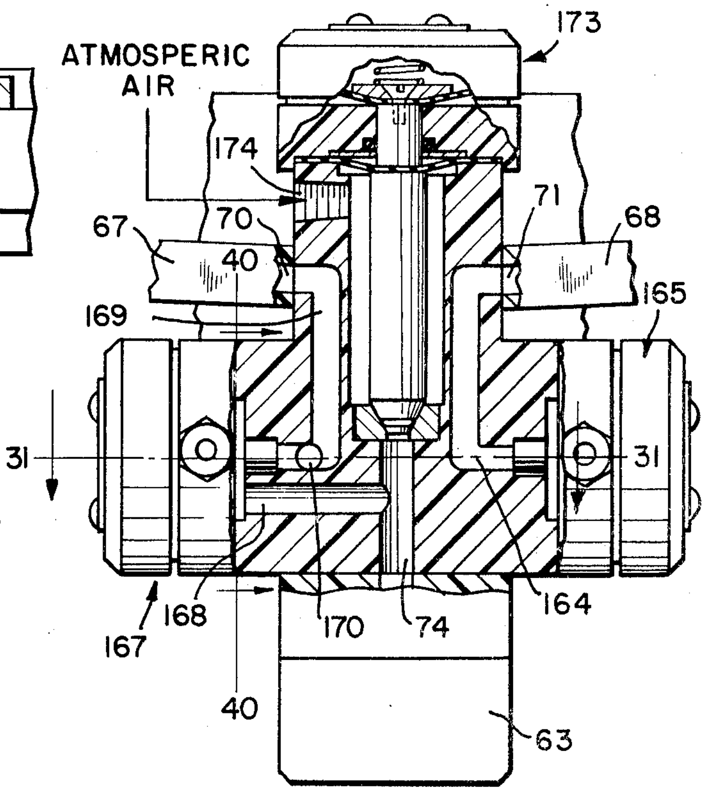
FIG. 38 is a partially cut away end view of an upper assembly for illustration of ink supply passages and purge liquid supply passages.

Referring now to FIG. 38 it will be seen that filtered ink flows from passage 70 through another passage 169 to a valve 167. Valve 167 is similar in construction to valve 150 and is illustrated in FIG. 31 with primed reference numerals corresponding to the unprimed reference numerals for valve 150. The arrangement for the passages connected to valve 167 is best illustrated in FIG. 40. It will be seen that rod 157' can be controlled to close off passage 169 by urging diaphragm 156' against insert 187'. Passages 166 and 168 are continuously connected. An air supply, not illustrated, operates valve 167 to permit the flow of ink into passage 168, which is connected to passage 74 for supply to elongated cavity 181 of housing 61.

Purge fluid flows from the purge fluid supply 172 through diaphragm valve 153 and cannister type filter 152 into passage 71 as previously discussed. The purge fluid then flows into a passage 164 which leads into diaphragm valve 165. Valve 165 is also of the same general construction as valve 150. Purge fluid does not flow directly from valve 165 into the supply passage 74 but is routed instead through the valve 167. A cross connection for this purpose is illustrated in FIG. 31. By this means it is possible to clean the liquid contacting portion of valve 167 with the purge fluid.

During the startup sequence when purge fluid must be supplied to the orifices 76, valve 150 is closed and valves 153, 165 and 167 are all opened to cause purge fluid to flow through valve 165, into the connecting passage 166, and through valve 167 into passage 168. Thus, valve 167 may be supplied with ink from passage 169 or with purge fluid from passage 166, but the outlet from valve 167 leads only to passage 168.

During shutdown periods with ink in the system and with valve 167 closed, ink is continually pumped through valve 150 and filter 151 into pssage 169. From passage 169 the ink flows into a bypass passage 170 and out of the print head. Upon leaving the pring head the ink flows through a valve 171, which is then opened, and back into the ink supply 159. Thus, there is provision to prevent collection of coagulated ink deposits by flushing valve 167 and maintaining a continuous flow of ink through other parts of the ink supply system.

As also illustrated in FIG. 38 there if a diaphragm valve 73 which may be opened to enable entry of atmospheric air (or filtered air at atmospheric pressure) into passage 174. The atmospheric air enters the print head at opening 174 which is connected by valve 173 with passages 174.

Figure 9:
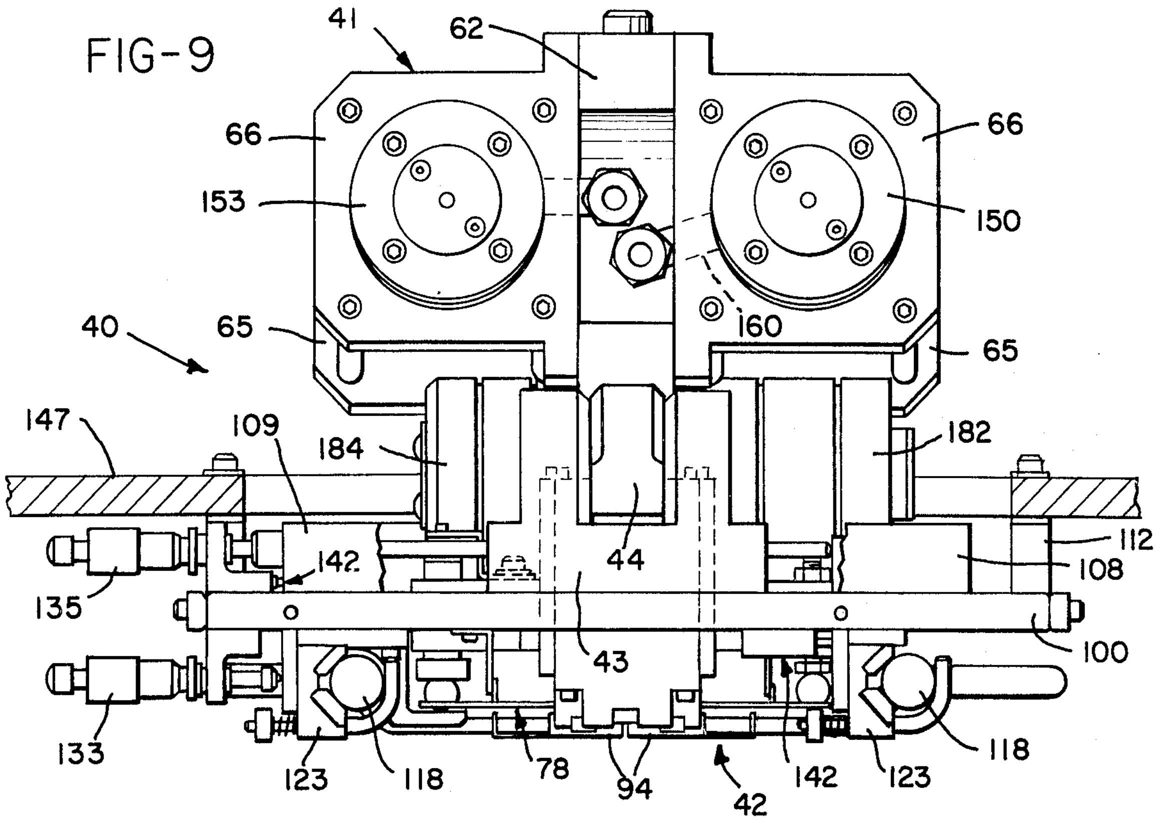
FIG. 9 is an end elevational view of a jet drop print head.
Figure 32:
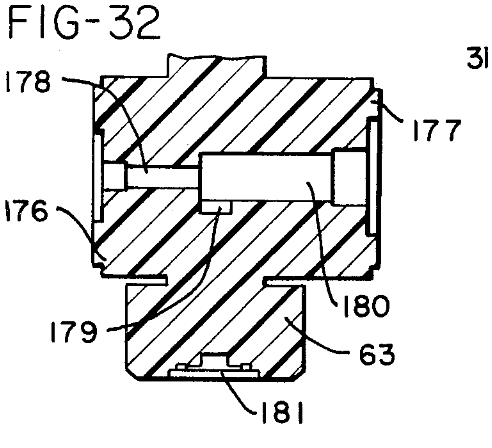
FIG. 32 is a view taken along lines 32—32 of FIG. 2.
Figure 33:
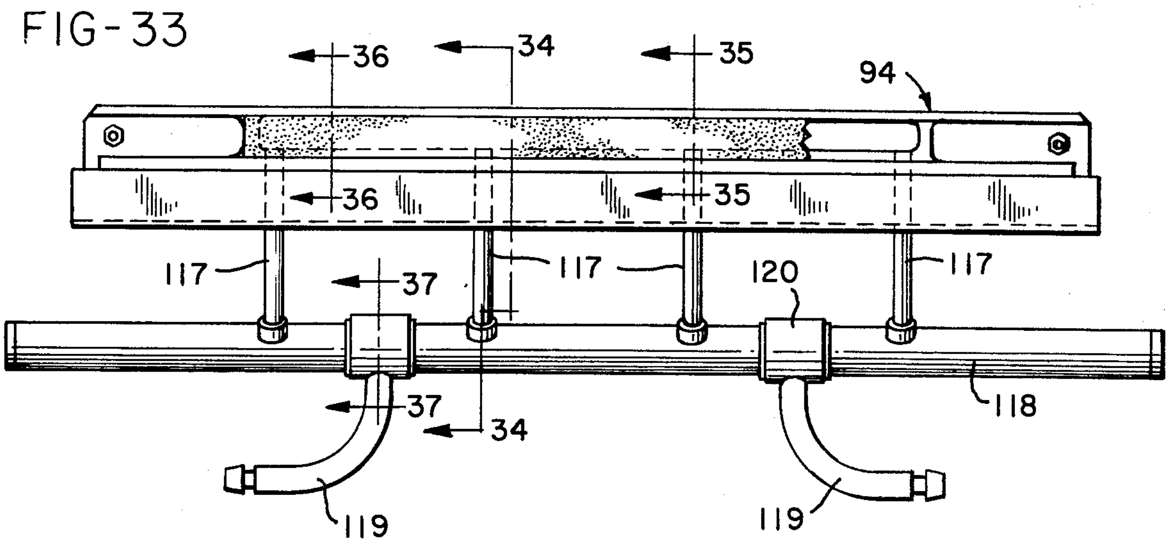
FIG. 33 is an illustration of a catcher assembly.
Figure 34:
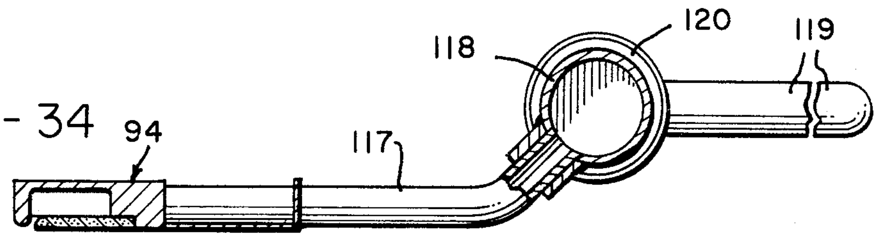
FIG. 34 is a view taken along lines 34—34 of FIG. 33.
Figure 35:
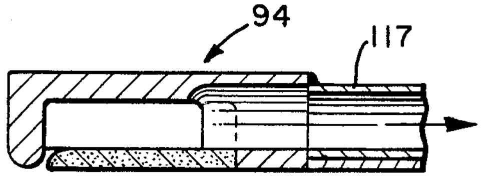
FIG. 35 is a view taken along lines 35—35 of FIG. 33.
Figure 36:
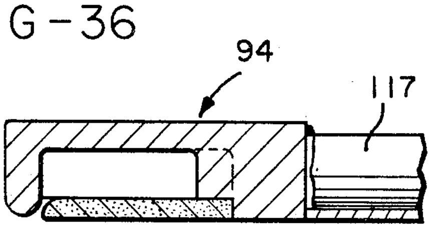
FIG. 36 is a view taken along lines 36—36 of FIG. 33.

Another pair of valves 184 and 182 are connected respectively to pressurized air and vacuum sources. These valves, which are illustrated in FIG. 9, are also air operated diaphragm valves, and they are connected to passage 179 (FIG. 2), which opens into the liquid discharge cavity 181. Valve 184 is mounted on a seat 176 (FIG. 32), and valve 182 is mounted on a seat 177. When valve 184 is open, pressurized air flows into a passage 178 and thence through passage 179 and cavities 181 and 149 to orifice plate 60. This is the operating condition of the system during startup and prior to admission of purge fluid into cavity 149. Passage 180 of FIG. 32 enables application of a vacuum to cavity 149. This vacuum application is made for a short period of time after shutdown as described.

While the form of apparatus herein described constitutes a preferred embodiment of the invention, it is to be understood that the invention is not limited to this precise form of appartus, and the changes may be made therein without departing from the scope of the invention.

What is claimed is:

1. Fluid supply apparatus for a jet drop printer comprising:

(a) valve housing means defining a valve inlet chamber and first, second and third conduits communicating with said inlet chamber, (b) printing liquid supply means for supplying a pressurized printing liquid to said first conduit, (c) a diaphragm facing said first conduit, (d) valve closing means for urging said diaphragm against said first conduit and preventing printing liquid from entering into said chamber, (e) purge liquid supply means for supplying a pressurized purge liquid into said chamber and cleansing the working face of said diaphragm, and (f) connecting means communicating with said third conduit for supplying the contents of said chamber to said printer.

2. Fluid supply apparatus according to claim 1 wherein said printing liquid supply means comprises a printing liquid control valve for controlling the flow of printing liquid to said first conduit and bypass means communicating with said first conduit for enabling continuous recirculation of printing liquid when said diaphragm is closed against said first conduit.

3. Fluid supply apparatus according to claim 2 wherein said purge liquid supply means comprises a purge liquid control valve of the pneumatically operated diaphragm type.

4. Fluid supply apparatus according to claim 3 wherein said printing liquid supply means comprises a filter between said printng liquid control valve and said valve inlet chamber.

5. Fluid supply apparatus according to claim 4 wherein said purge liquid supply means comprises a purge liquid supply valve upstream of said purge liquid control valve and a filter between said purge liquid supply valve and said purge liquid control valve.

6. Fluid supply apparatus according to claim 5 wherein said connecting means are defined by passages within said housing and include an elongated, open-sided cavity for exit of liquid from said housing.

7. Fluid supply apparatus according to claim 6 wherein said purge liquid control valve is mounted on said housing.

8. Fluid supply apparatus according to claim 7 wherein said housing is manufactured from clear plastic for facilitating inspection and dampening vibrations.

9. Fluid supply apparatus according to claim 1 wherein said first conduit is provided with an upstanding lip for forming a seal against said diaphragm.

10. Apparatus according to claim 9 wherein said valve closing means comprises a control rod bearing against said diaphragm on the side opposite said upstanding lip.

11. Apparatus according to claim 10 wherein said valve closing means further comprises a spring working against said control rod in the valve closing direction.

12. Apparatus according to claim 11 wherein said valve opening means comprises a second diaphragm connected to said control rod an a pneumatic chamber arranged to urge said second diaphragm in a direction to counteract and overcome the closing action of said spring.

13. Apparatus according to claim 12 wherein said purge liquid supply means comprises a pneumatically operated diaphragm valve.

* * * * *

UNITED STATES PATENT AND TRADEMARK OFFICE

CERTIFICATE OF CORRECTION

PATENT NO. : 4,080,608

DATED : March 21, 1978

INVENTOR(S) : Leonard G. Stoneburner & Ronald T. Wilson

It is certified that error appears in the above-identified patent and that said Letters Patent are hereby corrected as shown below:

Column 1, line 7, --disclosed-- should be inserted before "in".

Column 2, line 38, "fo" should be --for--.

Column 3, line 35, "section" should be --connection--.

Column 3, line 48, "vale" should be --value--.

Column 5, lines 48 and 49, "described" should be --mentioned--.

Column 5, line 57, "an" should be --as--.

Column 6, line 35, "included" should be --illustrated--.

Column 6, line 58, after "arrow" insert --128--.

Column 8, line 2, "botches" should be --notches--.

Column 8, line 5, "shows" should be --shoes--.

Column 8, line 7, "130" should be --195-- and "195" should be --131--.

Column 8, line 8, "126" should be --125--.

Column 8, line 11, "bg" should be --by--.

Column 8, line 18, "at" should be --as--.

Column 8, line 19, "an" should be --and--.

Column 8, line 22, "pivogtaly" should be --pivotally--.

Column 8, line 23, "bis" should be --bias--.

Column 8, line 43, "changed" should be --charged--.

Column 8, line 47, "33" should be --133--.

Column 8, line 53, "point" should be --print--.

Column 8, line 54, "put" should be --out--.

UNITED STATES PATENT AND TRADEMARK OFFICE

CERTIFICATE OF CORRECTION

PATENT NO. : 4,080,608

DATED : March 21, 1978

INVENTOR(S) : Leonard G. Stoneburner and Ronald T. Wilson

It is certified that error appears in the above-identified patent and that said Letters Patent are hereby corrected as shown below:

Column 9, line 11, "67" should be --68--.

Column 10, line 8, "pring" should be --print--.

Column 10, line 14, "if" should be --is--.

Column 10, line 15, "73" should be --173--.

Column 10, line 35, insert --above-- after "as".

Column 12, line 16, "an" should be --and--.

Signed and Sealed this

*Eighteenth* Day of *July 1978*

[SEAL]

*Attest:*

RUTH C. MASON
*Attesting Officer*

DONALD W. BANNER
*Commissioner of Patents and Trademarks*